Sept. 20, 1966    E. HUCKE    3,273,874
CONTROLLING APPARATUS
Filed Dec. 12, 1963    3 Sheets-Sheet 3
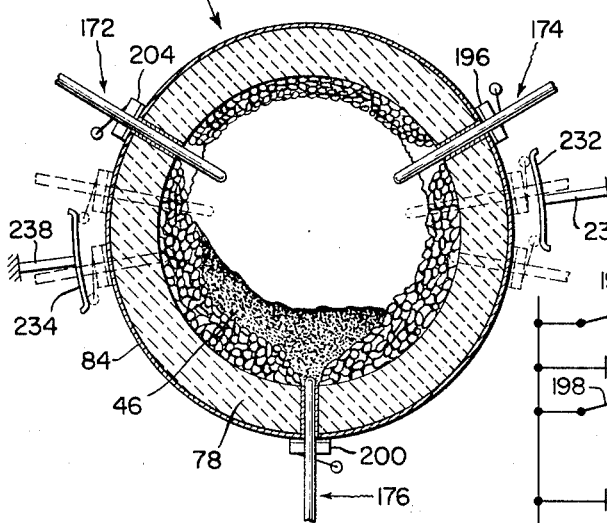
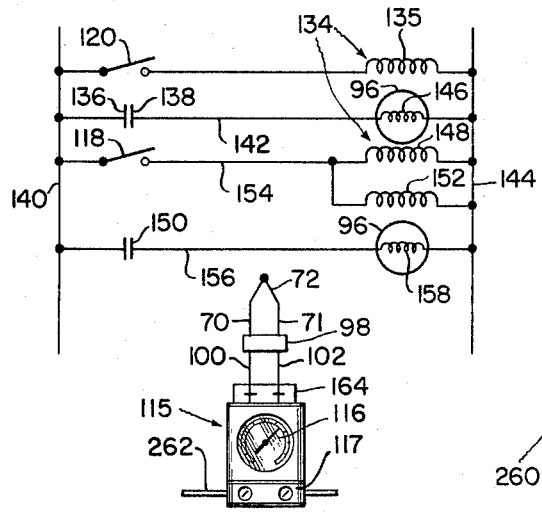
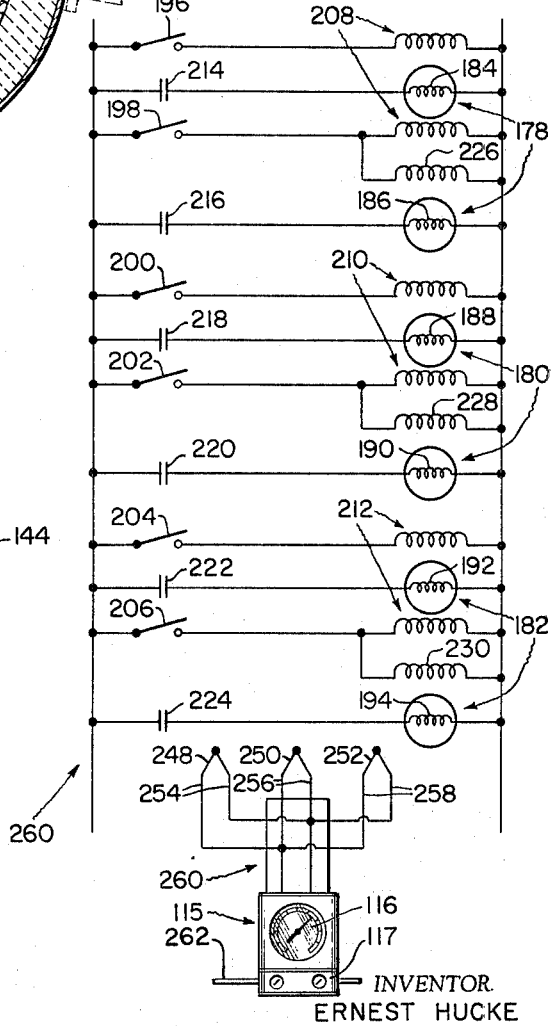
INVENTOR.
ERNEST HUCKE
BY Arthur H. Swenson
ATTORNEY.

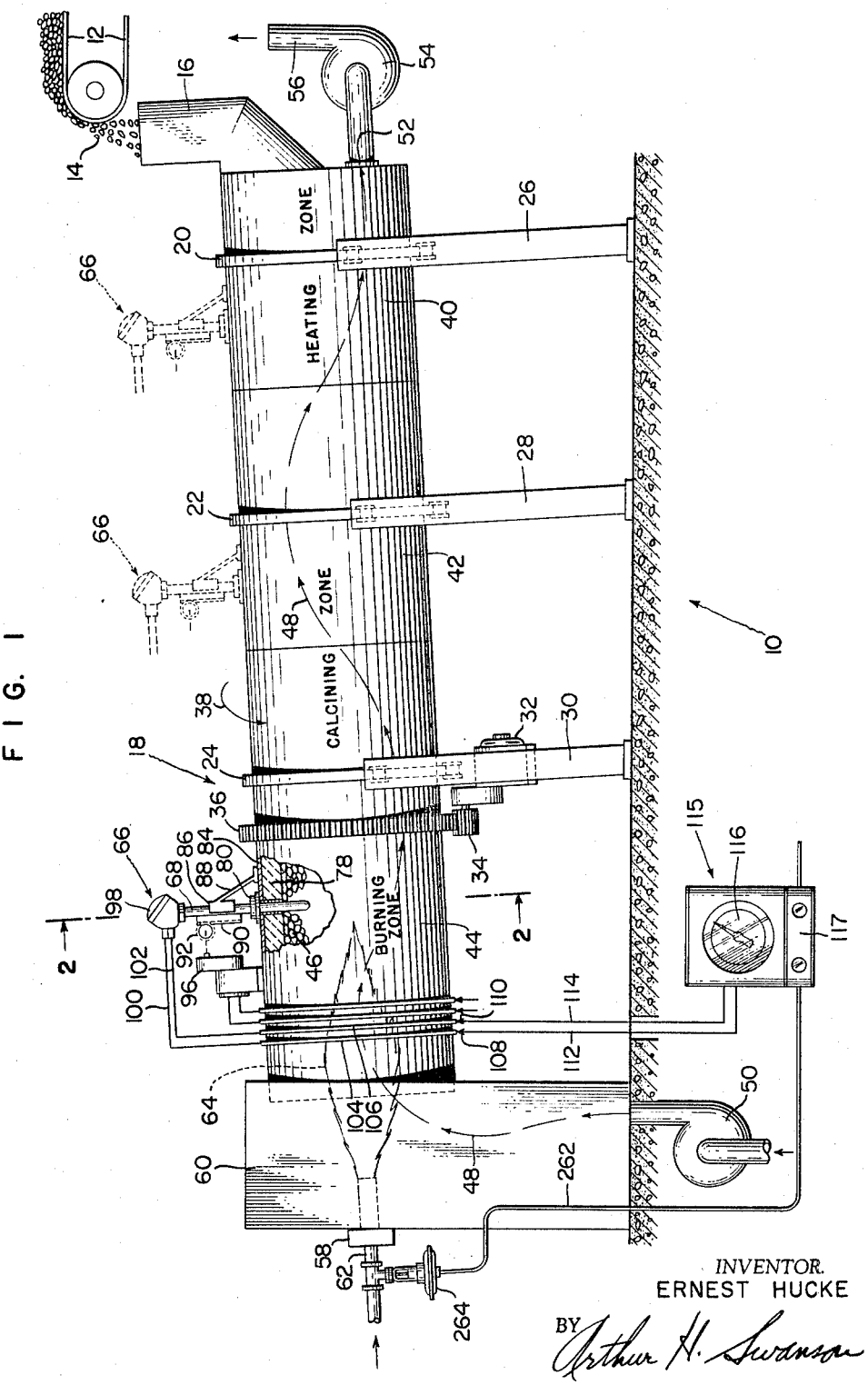

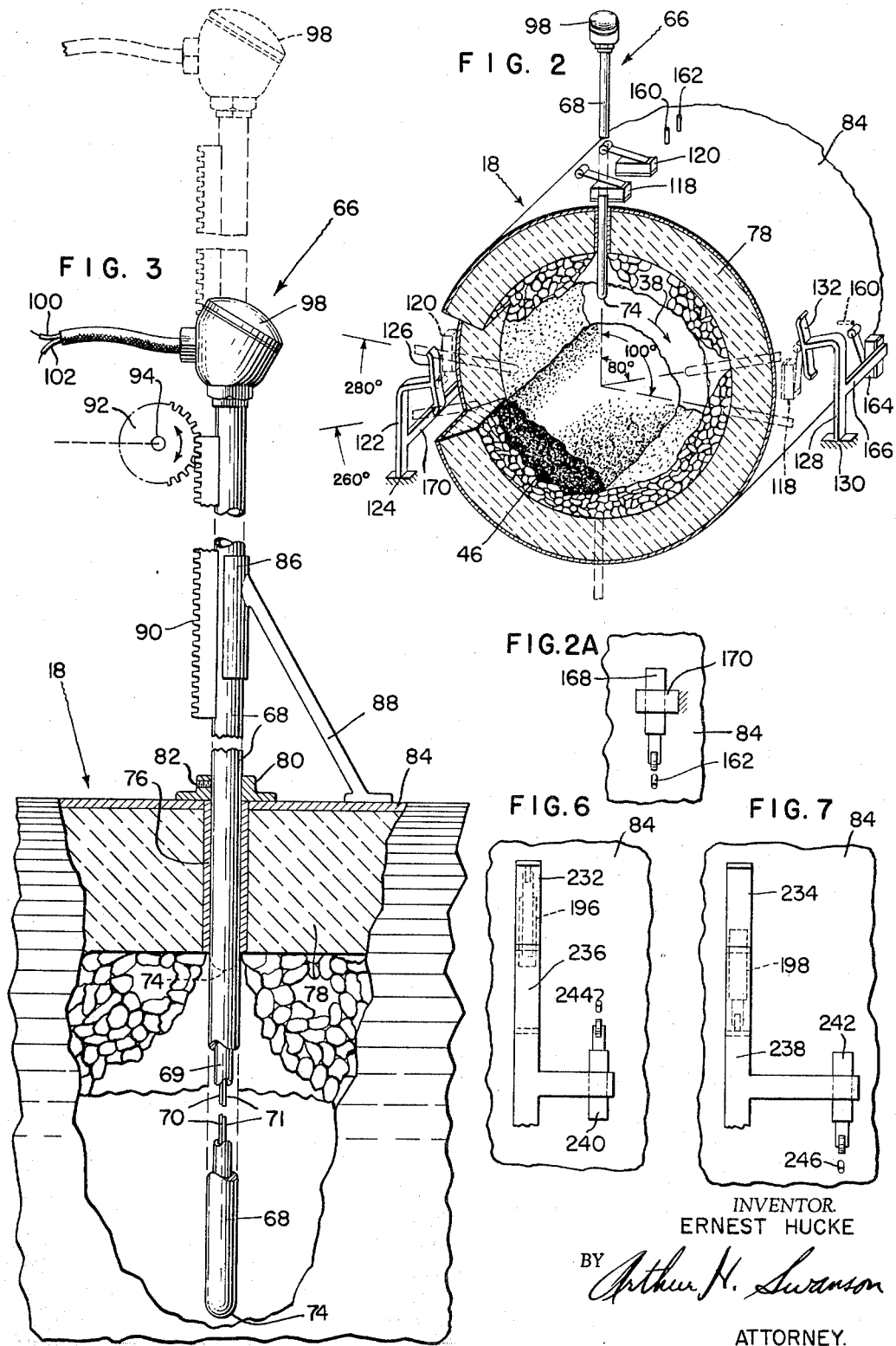

United States Patent Office 3,273,874
Patented Sept. 20, 1966

3,273,874
CONTROLLING APPARATUS
Ernest Hucke, Glenside, Pa., assignor to Honeywell Inc., a corporation of Delaware
Filed Dec. 12, 1963, Ser. No. 330,166
2 Claims. (Cl. 263—33)

It is an object of the present invention to disclose an automatically operated control apparatus which will control the amount of heat a burner introduces into an internal portion of a rotating kiln so that all parts of the mixture passing therethrough will be heated to a desired uniform temperature, even though the quantity and quality of this mixture is varied.

During the final stage of a cement manufacturing process, it is necessary to introduce the cement mix into a heating zone that is located at the end of a tilted gravity-fed rotating kiln so that it will be heated to a prescribed temperature by hot gases that are passed through the kiln. The cement mix is then moved by gravity and the rotation of the kiln into a calcining zone where the mix is heated by the hot gases to a temperature which is below the melting temperature of the mix. In this zone, the mix is formed into certain desired chemical compounds. The cement mix is then moved in a similar manner to that just described into the burning zone of the kiln, a zone into which the flame of a burner is introduced so that a hard chemical mixture known as clinker is formed.

In attempting to effect the previously-mentioned control, one encountered difficulty lies in providing a suitable probe to take a temperature measurement of chemical and/or mixtures of gases passing through the aforementioned burning zone of a rotating kiln whose temperature reaches as high as 2800 degrees Fahrenheit. This difficulty arises because the clinker formed in this zone has the inherent tendency to settle out of the mixture and adhere to the inner wall surface of the kiln and to the outer surface of a stationary temperature-sensing probe that is retained therein.

The passage of additional quantities of chemical mixtures, such as cement mixtures, through the rotating kiln, in turn, causes additional layers of clinker or similar residue to be cast out of the mixture onto the previously-referred-to initial layer that was formed on the temperature probe and the inner wall of the kiln.

Experimentation has further shown that when certain chemical products, forming a cement mixture which may contain different percentages of calcium, are passed through the burning zone of a kiln in the aforementioned cement manufacturing process, it is not unusual to find a twelve-inch thick layer of the aforementioned clinker formed on the stationary temperature probe that protrudes through the inner wall of the kiln.

It has further been found that the clinker formed on the end of the probe will act as a force on the end of a cantilever beam as additional rotation of the temperature probe takes place.

Studies have shown that as the aforementioned build-up of clinker continues, the increased weight of the clinker on the probe will cause the end of the probe to rupture and break away from the portion of the probe that is retained in a fixed position by the wall of the kiln as the probe is rotated through the cement clinker under measurement.

From the aforementioned description, it can be seen that this residue built up on temperature probes will prevent the sensing element in these probes from taking an accurate measurement of the temperature of the chemical mixture and/or gases in the kiln because the sensing element will have to sense the temperature of the mixture and/or gases through increasingly thicker layers of material as additional coatings of the residue are deposited on the probe.

It is, therefore, another object of the present invention to disclose a unique, self-cleaning, retractable temperature-sensing probe for a rotating kiln which will prevent the aforementioned, undesired clinker from forming thereon and, hence, is able to continuously produce an accurate signal whose magnitude varies in accordance with the temperature of the material and/or gas passing through the kiln so that the intensity of heat a burner is supplying to the kiln can be controlled thereby while changes in the quantity and quality of the material take place.

It is also another object of the present invention to disclose a timed probe driving mechanism for enabling only the tip of the temperature-sensing probe to protrude inwardly of the inner wall of the kiln when the kiln motion rotates the probe through the chemical products that are retained in the bottom portion of the kiln, thereby providing a probe structure whose tip is not prone to breakage.

Another object of the present invention is to make the exposed tip of the aforementioned probe structure of a metal-ceramic material.

It is still another object of the present invention to provide a stationary sleeve made of alumina or equivalent material through which a metal-ceramic retractable thermocouple protecting tube portion of the temperature probe can be drawn to thereby provide a means of removing therefrom any corrosive coatings caused by the clinker carried by the hot gases passing through the kiln.

It is another object of the present invention to provide a kiln with a modified form of the aforementioned control apparatus that comprises a plurality of spaced-apart temperature-sensing probes of the type just described so that a continuous measurement of the temperature of the material passing through a kiln can be made.

It is still another object of the present invention to provide a means of adjusting the travel of the aforementioned retractable temperature-sensing probe structures so that an accurate measurement can be made regardless of the percentage of clinker or other residue build-up on the inner wall of the kiln.

A better understanding of the present invention may be had from the following detailed description when read in connection with the accompanying drawings in which:

FIG. 1 is an arrangement of the kiln with the unique, retractable, self-cleaning, temperature-sensing probe mounted thereon;

FIG. 2 is a cross-sectional view taken along the lines 2—2 of FIG. 1;

FIG. 2A is a partial view of the left side of the kiln shown in FIG 2;

FIG. 3 is an elevational view showing the position that the temperature-sensing probe will be in when it is inserted into and retracted in a direction out of the kiln;

FIG. 4 is an electric circuit showing how the engagement and disengagement of limit switches mounted on the kiln are used to energize and de-energize the coil of a motor so that the temperature-sensing probe is moved toward the center of the kiln or away from the center of the kiln;

FIG. 5 is a view similar to FIG. 2, but showing how three temperature-sensing probes can be mounted in a slidable manner in the wall of a kiln to provide continuous measurement of the temperature of the material contained therein;

FIG. 6 is a side elevational view of the switches shown at the right side of FIG. 5;

FIG. 7 is a side elevation view of the switches shown at the left side of FIG. 5;

FIG. 8 is an electrical circuit showing how the engagement and disengagement of the limit switches mounted on the kiln are used to disengage the coils of a motor which are associated with each of the probes to sequentially move the probes toward and away from the center of the kiln while the tip of one of the three probes is sequentially held in contact with the material and/or gaseous atmosphere in the kiln so as to provide a continuous temperature measurement of the material and/or gaseous atmosphere in the kiln.

FIG. 1 of the drawing shows process equipment 10 which is used, for example, in the final stage of a chemical process such as a process that is used to manufacture cement. This process equipment is comprised of a conveyor unit 12 for introducing cement mix 14 that is to be processed into one end of a chute 16 so that the mix can flow through its lower end into the heating zone located at the right end of a rotating kiln 18. The kiln 18 has spaced-apart tire portions 20, 22, 24 which are mounted for rotation on their associated cradle support members 26, 28, 30. The support member 30 supports a motor 32. This motor is used to drive a reduction gear train 34 that, in turn, drives a ring gear 36 that is fixedly mounted on the external surface of the kiln 18 so that the kiln can be rotated in, for example, the direction indicated by the arrow 38.

The kiln is provided with three zones; namely, the heating zone 40, the calcining zone 42 and the burning zone 44, through which the cement mix 14 is passed in the manner previously described.

The cement mix 14 which is formed into clinker 46 in the burning zone is emitted out of the left end of the kiln where it is cooled by an air stream 48 being blown by the blower 50 through the kiln 18.

The right end of the kiln 18 is provided with a dust collector 52 and a blower 54 to exhaust the flow of gases and air passing through the heating zone by way of an exhaust duct 56 to a stack, not shown.

A burner 58 is shown mounted in a housing 60 positioned at the left end of the kiln which has a fuel supply conduit 62. The fuel that flows through the right end of the burner 58 is ignited so that the rather large flame 64 is cast into the burning zone of the kiln 18.

The parts of the process equipment 10, which have just been described, are of a well-known construction and form no part of the unique, automatically-operated control apparatus for this equipment to be hereinafter described to which the present disclosure is directed.

FIG. 2 shows an enlarged view of the unique, self-cleaning, retractable, temperature-sensing probe unit 66, shown in FIG. 1. The temperature-sensing probe unit 66 is shown in FIG. 3 as having a protecting tube 68 made of a metal-ceramic or equivalent material for covering an inner alumina tube 69 which, in turn, contains aluminum oxide sleeve protected thermocouple wires 70, 71 and the hot junction 72. In some applications it is desirable to omit the outer metal-ceramic tube 68 and make the sleeve 76 of a smaller inside diameter than that shown so that the outer surface of the tube 69 will be in slidable contact therewith.

Although it is preferred to make use of the probe unit 66 to sense temperature changes taking place in the burning zone of the kiln 18, this retractable probe unit 66 can also be used to advantage in the dotted-line positions shown for this probe 66 in the heating and calcining zones of the kiln 18.

A tip 74 of the protecting tube 68 is made of a metal-ceramic or an equivalent material. The upper end of the tube 68 is shown positioned for slidable engagement in a metal-ceramic sleeve 76 that is fixedly mounted in the furnace wall 78 made of a silicon carbide or equivalent heat-resistant material. In certain applications it may be desirable to have the hole in the brick wall 78 made of a smaller diameter than that shown in FIG. 3 so that the probe 68 can be brought into slidable engagement therewith, thereby eliminating the use of the sleeve 76.

An adjustable top flange 80 is shown fixedly positioned in a desired location on a portion of the protecting tube 68 by means of a set screw 82. This flange 80 can thus be slid along the protecting tube 68 to positions other than that shown and thereby adjust the extent to which the protecting tube can be moved through the metal and brick walls 78, 84 of the kiln 18.

One side of the upper end of the protecting tube 68 is supported for sliding engagement with a slide 86 which, in turn, is supported by means of a stationary strut member 88 that, in turn, is connected to the outer wall 84 of the kiln 18.

The other side of the protecting tube 68 is shown having a rack 90 formed thereon which is in engagement with a pinion 92 that is fixedly attached to the shaft 94 of a reversible motor 96.

An electrical lead terminal connection head 98 is shown mounted at the upper end of the temperature-sensing probe 68.

FIG. 1 shows thermocouple extension leads 100, 102 connecting the upper ends of the thermocouple wires 70, 71 with associated slip rings 104, 106 that are, in turn, fixedly mounted by insulating support members, not shown, on the outer surface of the kiln 18. The response of the thermocouple is taken from the slip rings 104, 106 by means of brushes 108, 110 and the electrical conductors 112, 114 connected thereto to a potentiometer measuring device 115 having temperature indicator 116 and any commercially-available, air-operated controller unit 117 therein.

Returning now to FIG. 2, it can be seen that a pair of limit switches 118, 120 is fixedly mounted on the exterior wall surface 84 of the kiln 18.

FIG. 2 also shows a first support member 122. One end of this first support member 122 is fixedly connected to a stationary part at 124 and its other end is provided with a switch-actuating plate 126 that is integral therewith.

A second support member 128 is shown in FIG. 2 that is spaced from the exterior surface of the kiln 18. One end of the second support member 128 is also fixedly connected to a stationary part at 130, and its other end is provided with a switch-actuating plate 132 that is integral therewith.

The arrangements shown in FIGS. 2 and 4 indicate that when switch 120 is rotated clockwise through 260 degrees and contacts the stationary switch contacting member 126, this switch 120 will be moved to a closed position. When this limit switch 120 is closed in this fashion, it is electrically connected to energize the in-probe coil 135 of the latching-in relay 134.

This relay 134, in turn, causes the coil 135 of a latching relay to bring contact 136 that is normally open into closed position with motor contact 138. This closing action of switch 136–138 will, thus, enable a supply current from an electric source, not shown, to flow through conductors 140, 142, 144 to energize the coil 146 of the motor 96. This action will, in turn, cause the shaft 94 and gear thereon to rotate in a clockwise direction as viewed from the position shown in FIG. 3. This will, in turn, cause the tip 74 of the temperature-sensing probe 68 to be moved from its dotted-line position shown in FIG. 3 to the solid-line position for this tip shown in the same figure, which latter position will occur when the temperature-sensing probe 66 reaches the solid-line position shown at the top of the kiln in FIG. 2.

The probe will remain in the in-kiln position until the second limit switch 118 energizes its associated stationary switch contacting members 132 and the switch 118 is closed. When the limit switch 118 is closed in this fashion, it is electrically connected to energize the out-probe coil 148 of the latching relay 134 as is shown in FIG. 4.

Energization of this relay 134 then simultaneously causes the contact 150 to close the latch relay coil 152 to energize same.

The last-mentioned switch action thus enables a supply current from an electric source, not shown, to flow through the conductors 140, 144, 154, 156 and thereby energize the reversing coil 158 of the motor 146 to make its shaft 94 and gear thereon rotate in a counter-clockwise direction as viewed in the position shown in FIG. 3.

Rotation of the motor in this fashion will cause the tip of the temperature-sensing probe 68 to be withdrawn.

It can be seen that the tip will be fully withdrawn to the dotted-line position as shown in FIG. 3 when it has been rotated by the kiln 18 to the one hundred degree position indicated in FIG. 2. FIG. 2 shows that the temperature-sensing probe 68 then remains in this withdrawn position until the kiln 18 has rotated the limit switch 120 to the dotted-line position which is shown for this switch and the aforementioned, described temperature-sensing probe movement is repeated.

FIGS. 2 and 4 also show a pair of spaced-apart stationary switch-actuating protuberances 160, 162 fixedly connected to and protruding outwardly from the outer surface of the kiln 18. When the switch-actuating protuberance 160 is rotated clockwise with the kiln 18 from its solid-line position into its dotted-line position and it contacts the limit switch 164 that is fixedly connected to the extension 166 of a stationary support member 128, electrical contacts in the switch will be closed. When this occurs, the hot junction of the thermocouple 72 will be connected by means of an electrical lead 71, 100, 102 to the potentiometer 116 by way of the now closed contacts in switch 164.

This closing switch action thus allows the temperature-sensing probe 68 to take a continuous accurate temperature measurement of the clinker 46 in the burning zone when the tip of the probe is in the retracted dotted-line position shown in FIGS. 2 and 3, and the tip is moved by the motion of the kiln 18 through this clinker 46. It can be seen that while the temperature measurement of the clinker is taking place, the clinker 46 is churned in a vertical direction against the left side wall of the kiln, then continues to climb up this side wall and is returned against the lower right side of the inner wall surface of the kiln 18. When the probe 66 reaches a point where it is no longer in contact with the hot churning clinker passing through the burning zone, the protuberance 162 will engage a second limit switch 168 which is fixedly mounted on the extension 170 of a stationary support member 122, shown in FIG. 2A. When the last-mentioned switch is engaged, its normally closed contacts will open and the temperature measurement of the clinker will cease until the first limit switch 164 is again closed and the clinker temperature-measuring cycle is again repeated.

In certain processes where chemicals in a rotating kiln are heated by gases passing therethrough it is desirable to continuously sense the temperature of these gases rather than the chemical itself. In such instances, the contacts of switches 164, 168 can be arranged in a reverse manner to that described so that continuous temperaure measurement will take place only when the temperature-sensing probe 68 is out of contact with the chemical 46 being processed.

FIG. 5 shows how three equally-spaced-apart temperature-sensing probe units 172, 174, 176 which are each identical to the previously-described, single temperature-sensing probe unit 66 can be arranged in the rotary kiln 18.

Each probe unit 172, 174, 175 is arranged to be sequentially moved toward and away from the center of the kiln by means of its associated motor 178, 180 or 182 that has coils 184, 186, 188, 190, 192 and 194 shown in FIG. 8 in the same manner as that previously described for the motor 96 associated with the probe unit 66.

Each of the probe units 172, 174, 176 is also provided with associated limit switches 196, 198; 200, 201; 204, 206. Associated relays 208, 210 or 212 normally open latching relays 214, 216, 218, 220, 222, 224 and latching relays coils 226, 228, 230 which have substantially the same function as that ascribed to the same components described under the description of FIGS. 2–4.

FIG. 5 shows stationary switch actuating plates 232, 234 mounted on stationary support plates 236, 238. When, for example, temperature-sensing probe unit 174 hits the switch actuating plate 232, switch 196 will be actuated so that the motor 178 will be energized to drive the probe in a direction from the center of and outwardly of the kiln 18.

When the temperature-sensing unit 174 and switch 198 pass the plate 234, switch 198 will be brought into contact therewith and the coil 186 will energize the motor so that the probe unit will be moved in a direction inwardly toward the center of the kiln 18.

The motors 180, 182 associated with the other probes 172, 176 are activated to move their probe units inwardly and outwardly of the center of the kiln in a manner similar to that just described for the temperature-sensing probe unit 174.

The other parts of the electrical circuit shown in FIG. 8 are similar and perform similar types of functions as those described under the description of the circuit shown in FIG. 4.

The temperature-sensing probe unit 174, e.g., employs additional switches 240, 242 that are fixedly attached to the associated stationary switch support plates 132, 134. Potentiometer swich actuating pins 244, 246 that are fixedly connected to the outer surface of the kiln are brought into contact with their associated switches 240, 242. This switch actuation can cause the balancing electric motor, not shown, of the potentiometer unit to be energized and a temperature record placed thereon, while the probe 174 is traveling through either the clinker in the kiln 18 or the gas and hot air that is in the kiln 18. In a similar manner to that just described the other two remaining plates 172, 176 can also have switches, not shown, similarly arranged on the stationary members so that the potentiometer circuit can be opened and closed similar to the manner in which the contacts of switch contact pins 244, 246 contact their potentiometer switches 240, 242.

In this way, a temperature measurement of the clinker 46 or the hot gases and hot air 48 can be sensed by means of the thermocouples 248, 250, 252, leads 254, 256, 258 and the electrical signal then recorded, by means of the box 260 containing the relays and switches shown at the top of FIG. 8, on the dial 116 of the potentiometer 115.

The potentiometer 115 may be of a type similar to that shown in the Wills Patent 2,423,540.

The potentiometers shown in FIGS. 1, 4 and 8 each have included therein an air-operated controller unit 117 that is also of a commercially-available type that includes an Indexet unit therein such as is disclosed in the Burdick Patent 2,548,943. This Indexet unit is used to advantage to change the magnitude of an amplified pneumatic pressure signal that is transmitted by conduit 262 to the head of the control valve 264 to maintain the fuel flow rate passing through the fuel line 62 to the burner 58 at a controlled rate that will maintain the temperature of the clinker passing through the burning zone of the kiln 18 at a constant temperature.

As the temperature in the kiln is being sensed by the temperature-sensing probe 66 shown in FIG. 2 or one of the three probes 172, 174, 176 shown in FIG. 5, an indication of the magnitude of this temperature will also be indicated on the dial 116. This temperature extends, under normal circumstances, as high as 2800 degrees Fahrenheit.

From the aforementioned description it can be seen that, for the first time, a temperature-sensing probe has been disclosed which, because of its retractable, self-cleaning construction, can more accurately sense and therefore more accurately control the temperature of chemical mixes such as hot clinker passing through a rotary kiln without this probe being subject to the customary shock, breakage and clinker adherence by the clinker that is passed in a whirling manner therethrough.

What is claimed is:

1. In an apparatus for converting cement powder into cement clinker which comprises a cement powder drying kiln having a silicon carbon wall, a driving means operably connected to rotate the kiln, a cement powder supply duct communicating with one end of the kiln, means for introducing a flow of air into the other end of the kiln, a burner for introducing a flame into the last-mentioned end of the kiln to heat the air and cement clinker, an outlet at the last-mentioned end of the kiln to remove clinker therefrom, the improvement comprising a self-cleaning temperature-sensing probe having a hollow elongated well portion operably mounted on the outer wall of the kiln and for physical surface-to-surface non-rotatable sliding contact with a silicon carbon wall portion of said kiln that forms an opening therein, a potentiometric measuring and indicating means comprising a temperature-sensing element positioned in the well to sense the temperature through an inner closed end thereof, a controller operably connected with the temperature-sensing element to produce a control signal whose magnitude is varied in accordance with changes occurring in the temperature sensed by the probe, electromechanical means operably connected with the well portion, to intermittently move the probe and its temperature-sensing element through the wall portion toward and away from the center of the kiln toward an in-kiln position in which a tip of the inner closed end of the well and a portion of its side wall extending therefrom are exposed to the atmosphere within the kiln and an out-of-kiln position in which only the tip is exposed to the cement powder being processed into clinker while the kiln is being moved by the kiln rotating means, and said controller being operably connected to the burner to transmit the control signal thereto to alter the intensity of the flame thereof in accordance with the magnitude of the signal when the well and its temperature-sensing element is positioned in its out-of-kiln position.

2. An apparatus to control the temperature of a tacky material being transmitted along the inner, lower and side wall surfaces of a kiln that is operably connected for rotation with a driving means, comprising a kiln, a heat-resistant metal ceramic part forming an integral passageway through the wall of the kiln, a temperature-measuring probe having a first outer surface portion that is comprised of a part that is in physical surface-to-surface contact with the metal ceramic part and a part that extends away and in an outward direction from the outer wall of the kiln, the probe having a second outer surface portion forming a closed temperature-sensing tip thereof that is positioned to protrude into the interior of the kiln and into contact with the tacky material when the rotary movement of the kiln moves the tip into contact with the material, an electromechanical means operably connected to the probe to move the first surface portion of the probe into the interior of the kiln when the rotary movement of the kiln moves the tip of the probe out of contact with the material in the kiln and the electromechanical means being further operably connected to retract the probe to a position that will return the first surface portion to its in-sleeve position when further rotary movement of the kiln brings the tip of probe into contact with the tacky material, means operably connected to the probe to continuously indicate the temperature measured by the probe while its tip is moved into and out of contact with the material by the electromechanical means, control means to control the temperature of the kiln and means operably connected to the probe to adjust the control means at the time the tip of the probe is in one of its two positions.

References Cited by the Examiner

UNITED STATES PATENTS

| 2,081,595 | 5/1937 | McIntosh | 136—4.76 |
| 2,303,843 | 12/1942 | Knoblauch | 263—32 X |
| 3,018,663 | 1/1962 | Dunlop | 136—4 X |
| 3,091,119 | 5/1963 | Fischer et al. | 73—343 |
| 3,152,479 | 10/1964 | Small | 73—352 X |

FOREIGN PATENTS 68,567  11/1942  Norway.

FREDERICK L. MATTESON, JR., *Primary Examiner.*

JOHN J. CAMBY, *Examiner.*

D. A. TAMBURRO, *Assistant Examiner.*